E. R. MITCHELL.
FLOOR BOARD ANTIRATTLING DEVICE.
APPLICATION FILED JULY 26, 1913.
1,114,503.
Patented Oct. 20, 1914.
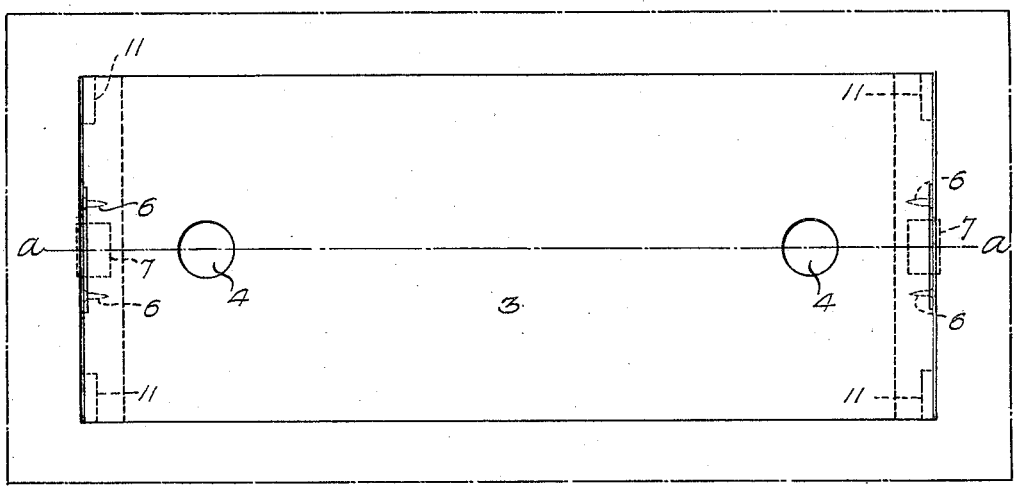
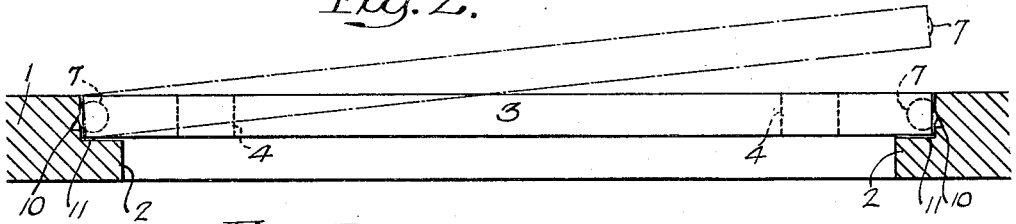
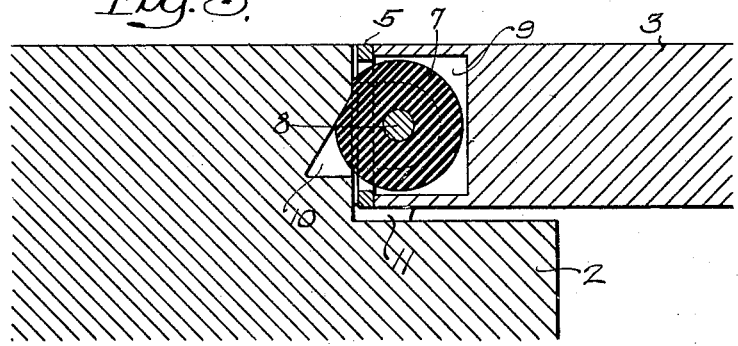
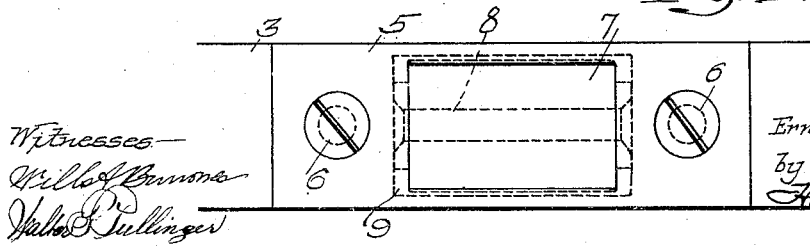

UNITED STATES PATENT OFFICE.

ERNEST R. MITCHELL, OF PHILADELPHIA, PENNSYLVANIA, ASSIGNOR TO MITCHELL SPECIALTY COMPANY, OF PHILADELPHIA, PENNSYLVANIA, A CORPORATION OF PENNSYLVANIA.

FLOOR-BOARD-ANTIRATTLING DEVICE.

1,114,503.      Specification of Letters Patent.      Patented Oct. 20, 1914.

Application filed July 26, 1913. Serial No. 781,372.

*To all whom it may concern:*

Be it known that I, ERNEST R. MITCHELL, a citizen of the United States, residing in Philadelphia, Pennsylvania, have invented certain Improvements in Floor-Board-Antirattling Devices, of which the following is a specification.

One object of this invention is to provide a device particularly adaptable to the removable floor section of a motor vehicle, for preventing said section from moving relatively to the main portion of the floor and consequently causing the objectionable rattling noise ordinarily produced under conditions of use, it being especially desired that said device shall be relatively simple, substantial, and inexpensive in its construction. These objects and other advantageous ends I secure as hereinafter set forth, reference being had to the accompanying drawings, in which:—

Figure 1 is a plan of a portion of the floor of a motor vehicle showing the application of my invention thereto; Fig. 2 is a vertical section on the line a—a, Fig. 1; Fig. 3 is a vertical section on an enlarged scale illustrating the detail construction of one of the holding rollers; Fig. 4 is a front elevation of a portion of one end of the removable floor section, further illustrating the invention.

In the above drawings, 1 represents the main portion of the floor of a motor vehicle, which at its sides is provided with shouldered portions 2 for the support of the removable floor section 3. This latter is usually in the form of a more or less elongated rectangular piece of wood or other suitable material of such thickness that the shoulders 2 support its top surface substantially flush with the level of the main portion of the floor. Said section 3 adjacent each end is usually provided with finger holes 4 or other suitable devices whereby it may be conveniently engaged for purposes of removal and in order to prevent it rattling under conditions of use, I mount in each end, a metallic casing 5 held in place by screws 6 and providing an elongated recess 9 of rectangular section in which is mounted a rubber or other resilient roller 7. The latter is preferably carried on a metallic spindle 8 which extends longitudinally through the recess 9 in which the roller is mounted and is rotatably or permanently fixed in the ends of the casing 5 in such position as to permit the cylindrical surface of the roller to project some distance beyond the plane of the end of the floor section 3. It is immaterial whether the roller 7 rotates on the spindle 8 or whether it is fixed to said spindle, which itself rotates in suitable bearings of the casing structure 5.

The edges of the main floor structure abutting the ends of the removable section 3 are recessed as at 10 immediately adjacent the roller 7 as shown in Fig. 3, being preferably under-cut so as to be of an angular section. It is preferable that the edge of the main floor section immediately above the recess 10 shall extend substantially at right angles to its top face to a point a short distance below the level of the top of the roller 7 when the removable floor section is in its normal position, and from this point the wall of the recess extends inwardly into the edge of the main floor section at an angle of from 30 to 45°, for example. As a result of this construction, when one end of the removable floor section 3 is made to rest upon the shoulder 2 of the main floor body in the position indicated in dotted lines in Fig. 2, with one of its rollers 7 entered in its corresponding recess, the other end of said section would freely enter the opening in the floor so as to rest upon the second shoulder 2, except for the projection of the second resilient roller 7 which prevents this action. If now pressure be exerted upon the still elevated end of the removable floor section, the rubber of one or both rollers is compressed until finally the second roller enters its recess in the adjacent portion of the floor body.

Owing to the inwardly inclined walls of the recesses 10, both rollers by reason of their tendency to return to their original cylindrical forms, draw or tend to draw the removable floor section downwardly into engagement with the shoulders 2 and hold it in intimate contact with the latter while preventing its relative movement regardless of the vibration to which the motor vehicle is ordinarily subjected. In order to still further insure the complete prevention of rattling or noise due to relative movement which might occur between the floor body and the removable floor section, I may place thin rubber strips 11 on the upper faces of the shoulders 2 so that they will be engaged by the lower face of the removable floor section by reason of the co-action of the rollers and the angular walls of the recesses 10.

When it is desired to remove the floor section, the operator, after inserting a finger in one of the openings 4, draws upwardly one end of said section 3 and in so doing causes one or both of the rollers 7 to be compressed sufficiently to allow it to pass out of the recess 10. In any case, the action of the rollers effectually prevents any such relative movement between the floor body and the floor section as might otherwise produce rattling or other objectionable noise and at the same time allows the said floor section to be conveniently removed or replaced.

I claim:—

1. The combination of a floor for a motor vehicle having an opening and provided with supporting shoulders; and a removable section fitting said opening and resting on said shoulders, each end of said section and the adjacent edge of the opening constituting two parts, of which one is provided with a resilient roller and the other has an undercut recess formed with an inclined wall co-acting with said roller to hold the removable section in engagement with the shoulders.

2. The combination of a floor for motor vehicles having an opening provided with supporting shoulders; resilient strips on said shoulders; a removable floor section mounted in the opening in position to rest on said strips; and an anti-rattling device at each end of said floor section, the same consisting of a resilient roller mounted in one of the parts comprised by the floor body and the removable section, the other of said parts having an under-cut recess for the reception of said roller.

3. The combination of a floor for motor vehicle having an opening provided with supporting shoulders; a removable section fitting said opening and formed to rest upon said shoulders, there being recesses formed in the edges of the floor structure adjacent the shoulders and having walls inclined inwardly from the opening; a removable floor section fitting the opening; with a resilient roller in each end of said section formed to enter said recesses and remain in the upper portions thereof when the removable section occupies its normal position.

In testimony whereof, I have signed my name to this specification, in the presence of two subscribing witnesses.

ERNEST R. MITCHELL.

Witnesses:
WILLIAM E. BRADLEY,
JOS. H. KLEIN.

---

Copies of this patent may be obtained for five cents each, by addressing the "Commissioner of Patents, Washington, D. C."